United States Patent
Morrison et al.

(10) Patent No.: US 8,228,304 B2
(45) Date of Patent: *Jul. 24, 2012

(54) SIZE/SCALE ORIENTATION DETERMINATION OF A POINTER IN A CAMERA-BASED TOUCH SYSTEM

(75) Inventors: Gerald Morrison, Calgary (CA); Trevor Akitt, Calgary (CA); Scott Su, Calgary (CA)

(73) Assignee: SMART Technologies ULC (CA)

( * ) Notice: Subject to any disclaimer, the term of this patent is extended or adjusted under 35 U.S.C. 154(b) by 153 days.

This patent is subject to a terminal disclaimer.

(21) Appl. No.: 12/482,841

(22) Filed: Jun. 11, 2009

(65) Prior Publication Data

US 2010/0060613 A1    Mar. 11, 2010

Related U.S. Application Data

(63) Continuation of application No. 11/236,622, filed on Sep. 28, 2005, now Pat. No. 7,619,617, which is a continuation of application No. 10/294,917, filed on Nov. 15, 2002, now Pat. No. 6,954,197.

(51) Int. Cl.
*G06F 3/41* (2006.01)

(52) U.S. Cl. .......................... 345/173; 345/178

(58) Field of Classification Search .................... 345/39, 345/156–158, 168–175, 180–184; 178/18.01–18.04; 250/221, 559.31; 600/407, 439; 348/39; 701/26; 382/100

See application file for complete search history.

(56) References Cited

U.S. PATENT DOCUMENTS

| | | |
|---|---|---|
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |

(Continued)

FOREIGN PATENT DOCUMENTS

AU     2003233728 A1    12/2003

(Continued)

OTHER PUBLICATIONS

Jul. 5, 2010 Office Action, with English translation, for Japanese Patent Application No. 2005-000268 (6 pages).

(Continued)

*Primary Examiner* — Prabodh M Dharia
(74) *Attorney, Agent, or Firm* — Katten Muchin Rosenman LLP

(57) ABSTRACT

A touch system includes a touch surface and at least two cameras associated with the touch surface. The at least two cameras acquire images of the touch surface from different locations and having overlapping fields of view. A digital signal processor is associated with each camera. The digital signal processors process pixel data acquired by selected pixel subsets of the at least two digital cameras to generate pointer characteristic data when a pointer exists in the acquired images. The pointer characteristic data identifies edges of the pointer. A master digital signal processor triangulates the edge information in the pointer characteristic data to determine a bounding area that represents a pointer perimeter.

24 Claims, 9 Drawing Sheets

U.S. PATENT DOCUMENTS

| | | |
|---|---|---|
| 4,243,879 A | 1/1981 | Carroll et al. |
| 4,247,767 A | 1/1981 | O'Brien et al. |
| 4,420,261 A | 12/1983 | Barlow et al. |
| 4,459,476 A | 7/1984 | Weissmueller et al. |
| 4,468,694 A | 8/1984 | Edgar |
| 4,507,557 A | 3/1985 | Tsikos |
| 4,550,250 A | 10/1985 | Mueller et al. |
| 4,553,842 A | 11/1985 | Griffin |
| 4,558,313 A | 12/1985 | Garwin et al. |
| 4,639,720 A * | 1/1987 | Rympalski et al. ............ 345/174 |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa |
| 4,843,568 A * | 6/1989 | Krueger et al. ............... 382/100 |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,097,516 A | 3/1992 | Amir |
| 5,103,085 A | 4/1992 | Zimmerman |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,170,352 A * | 12/1992 | McTamaney et al. .......... 701/26 |
| 5,179,369 A | 1/1993 | Person et al. |
| 5,196,835 A | 3/1993 | Blue et al. |
| 5,196,836 A | 3/1993 | Williams |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,854,491 A * | 12/1998 | Pryor et al. ............... 250/559.31 |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura |
| 6,002,808 A | 12/1999 | Freeman |
| 6,008,798 A | 12/1999 | Mato, Jr. et al. |
| 6,031,531 A | 2/2000 | Kimble |
| 6,061,177 A | 5/2000 | Fujimoto |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,320,597 B1 | 11/2001 | Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 | 3/2002 | Murakami et al. |
| 6,377,228 B1 | 4/2002 | Jenkin et al. |

| Patent | Date | Inventor |
|---|---|---|
| 6,384,743 B1 | 5/2002 | Vanderheiden |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,504,532 B1 | 1/2003 | Ogasahara et al. |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,540,366 B2 | 4/2003 | Keenan et al. |
| 6,540,679 B2 * | 4/2003 | Slayton et al. ............... 600/439 |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 * | 9/2003 | Rafii et al. .................. 345/168 |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,803,906 B1 * | 10/2004 | Morrison et al. ............. 345/173 |
| 6,828,959 B2 | 12/2004 | Takekawa et al. |
| 6,864,882 B2 | 3/2005 | Newton |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,032 B2 | 9/2005 | Morrison et al. |
| 6,954,197 B2 * | 10/2005 | Morrison et al. ............. 345/158 |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,859 B1 * | 8/2006 | Pryor ............................ 345/173 |
| 7,084,868 B2 | 8/2006 | Farag et al. |
| 7,098,392 B2 | 8/2006 | Sitrick et al. |
| 7,121,470 B2 | 10/2006 | McCall et al. |
| 7,151,533 B2 | 12/2006 | Van Iperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,196,730 B2 * | 3/2007 | Mihelcic ....................... 348/373 |
| 7,202,860 B2 | 4/2007 | Ogawa |
| 7,227,526 B2 | 6/2007 | Hildreth et al. |
| 7,232,986 B2 | 6/2007 | Worthington et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,538,759 B2 | 5/2009 | Newton |
| 7,559,664 B1 | 7/2009 | Walleman et al. |
| 7,619,617 B2 | 11/2009 | Morrison et al. |
| 7,654,826 B2 * | 2/2010 | Faulkner et al. ............. 434/130 |
| 7,692,625 B2 * | 4/2010 | Morrison et al. ............. 345/156 |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildrerth et al. |
| 2002/0067922 A1 | 6/2002 | Harris |
| 2002/0071038 A1 * | 6/2002 | Mihelcic ....................... 348/207 |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |

| | | | |
|---|---|---|---|
| 2004/0031779 A1 | 2/2004 | Cahill et al. | |
| 2004/0032401 A1 | 2/2004 | Nakazawa et al. | |
| 2004/0046749 A1 | 3/2004 | Ikeda | |
| 2004/0051709 A1 | 3/2004 | Ogawa et al. | |
| 2004/0108990 A1 | 6/2004 | Lieberman | |
| 2004/0125086 A1 | 7/2004 | Hagermoser et al. | |
| 2004/0149892 A1 | 8/2004 | Akitt et al. | |
| 2004/0150630 A1 | 8/2004 | Hinckley et al. | |
| 2004/0169639 A1 | 9/2004 | Pate et al. | |
| 2004/0178993 A1 | 9/2004 | Morrison et al. | |
| 2004/0178997 A1 | 9/2004 | Gillespie et al. | |
| 2004/0179001 A1 | 9/2004 | Morrison et al. | |
| 2004/0189720 A1 | 9/2004 | Wilson et al. | |
| 2004/0201575 A1 | 10/2004 | Morrison | |
| 2004/0204129 A1 | 10/2004 | Payne et al. | |
| 2004/0218479 A1 | 11/2004 | Iwamoto et al. | |
| 2004/0221265 A1 | 11/2004 | Leung et al. | |
| 2004/0252091 A1 | 12/2004 | Ma et al. | |
| 2005/0052427 A1 | 3/2005 | Wu et al. | |
| 2005/0057524 A1 | 3/2005 | Hill et al. | |
| 2005/0077452 A1* | 4/2005 | Morrison et al. | 250/221 |
| 2005/0083308 A1 | 4/2005 | Homer et al. | |
| 2005/0104860 A1 | 5/2005 | McCreary et al. | |
| 2005/0128190 A1 | 6/2005 | Ryynanen | |
| 2005/0151733 A1 | 7/2005 | Sander et al. | |
| 2005/0156900 A1 | 7/2005 | Hill et al. | |
| 2005/0190162 A1 | 9/2005 | Newton | |
| 2005/0241929 A1 | 11/2005 | Auger et al. | |
| 2005/0243070 A1 | 11/2005 | Ung et al. | |
| 2005/0248539 A1 | 11/2005 | Morrison et al. | |
| 2005/0248540 A1 | 11/2005 | Newton | |
| 2005/0270781 A1 | 12/2005 | Marks | |
| 2005/0276448 A1 | 12/2005 | Pryor | |
| 2006/0012579 A1 | 1/2006 | Sato | |
| 2006/0022962 A1 | 2/2006 | Morrison et al. | |
| 2006/0028456 A1 | 2/2006 | Kang | |
| 2006/0034486 A1 | 2/2006 | Morrison et al. | |
| 2006/0075356 A1* | 4/2006 | Faulkner et al. | 715/782 |
| 2006/0152500 A1 | 7/2006 | Weng | |
| 2006/0158437 A1 | 7/2006 | Blythe et al. | |
| 2006/0170658 A1 | 8/2006 | Nakamura et al. | |
| 2006/0197749 A1 | 9/2006 | Popovich | |
| 2006/0202953 A1 | 9/2006 | Pryor et al. | |
| 2006/0227120 A1 | 10/2006 | Eikman | |
| 2006/0244734 A1 | 11/2006 | Hill et al. | |
| 2006/0274067 A1 | 12/2006 | Hikai | |
| 2006/0279558 A1 | 12/2006 | Van Delden et al. | |
| 2007/0002028 A1 | 1/2007 | Morrison et al. | |
| 2007/0019103 A1 | 1/2007 | Lieberman et al. | |
| 2007/0075648 A1 | 4/2007 | Blythe et al. | |
| 2007/0075982 A1 | 4/2007 | Morrison et al. | |
| 2007/0089915 A1 | 4/2007 | Ogawa et al. | |
| 2007/0116333 A1 | 5/2007 | Dempski et al. | |
| 2007/0126755 A1 | 6/2007 | Zhang et al. | |
| 2007/0139932 A1 | 6/2007 | Sun et al. | |
| 2007/0152984 A1 | 7/2007 | Ording et al. | |
| 2007/0152986 A1 | 7/2007 | Ogawa et al. | |
| 2007/0165007 A1 | 7/2007 | Morrison et al. | |
| 2007/0167709 A1* | 7/2007 | Slayton et al. | 600/407 |
| 2007/0205994 A1 | 9/2007 | van Ieperen | |
| 2007/0236454 A1 | 10/2007 | Ung et al. | |
| 2007/0273842 A1 | 11/2007 | Morrison | |
| 2008/0029691 A1 | 2/2008 | Han | |
| 2008/0042999 A1 | 2/2008 | Martin | |
| 2008/0055262 A1 | 3/2008 | Wu et al. | |
| 2008/0055267 A1 | 3/2008 | Wu et al. | |
| 2008/0062140 A1 | 3/2008 | Hotelling et al. | |
| 2008/0062149 A1 | 3/2008 | Baruk | |
| 2008/0068352 A1 | 3/2008 | Worthington et al. | |
| 2008/0083602 A1 | 4/2008 | Auger et al. | |
| 2008/0106706 A1 | 5/2008 | Holmgren et al. | |
| 2008/0122803 A1 | 5/2008 | Izadi et al. | |
| 2008/0129707 A1 | 6/2008 | Pryor | |
| 2008/0259050 A1 | 10/2008 | Lin et al. | |
| 2008/0259052 A1 | 10/2008 | Lin et al. | |
| 2009/0058832 A1 | 3/2009 | Newton | |
| 2009/0058833 A1 | 3/2009 | Newton | |
| 2009/0146972 A1 | 6/2009 | Morrison et al. | |

FOREIGN PATENT DOCUMENTS

| | | |
|---|---|---|
| AU | 2006243730 A1 | 11/2006 |
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2412878 A1 | 1/2002 |
| CA | 2341918 A1 | 9/2002 |
| CA | 2386094 A1 | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2493236 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 198 10 452 A1 | 12/1998 |
| DE | 60124549 | 9/2007 |
| EP | 0125068 A2 | 11/1984 |
| EP | 0 279 652 A2 | 8/1988 |
| EP | 0 347 725 A2 | 12/1989 |
| EP | 0420335 | 4/1991 |
| EP | 0 657 841 A1 | 6/1995 |
| EP | 0 762 319 A2 | 3/1997 |
| EP | 0 829 798 A2 | 3/1998 |
| EP | 0897161 A1 | 2/1999 |
| EP | 0911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1420335 A2 | 5/2004 |
| EP | 1 450 243 A2 | 8/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 | 1/2006 |
| EP | 1674977 | 6/2006 |
| EP | 1 297 488 B1 | 11/2006 |
| EP | 1741186 | 1/2007 |
| EP | 1766501 | 3/2007 |
| EP | 1830248 A1 | 9/2007 |
| EP | 1877893 | 1/2008 |
| ES | 2279823 T3 | 9/2007 |
| GB | 1575420 | 9/1980 |
| GB | 2176282 A | 5/1986 |
| GB | 2204126 A | 11/1988 |
| GB | 2263765 A | 8/1993 |
| JP | 57-211637 A | 12/1982 |
| JP | 61-196317 A | 8/1986 |
| JP | 61-260322 A | 11/1986 |
| JP | 62-005428 | 1/1987 |
| JP | 63-223819 | 9/1988 |
| JP | 3-054618 A | 3/1991 |
| JP | 03-244017 | 10/1991 |
| JP | 4-350715 A | 12/1992 |
| JP | 4-355815 A | 12/1992 |
| JP | 5-181605 A | 7/1993 |
| JP | 5-189137 A | 7/1993 |

| | | | |
|---|---|---|---|
| JP | 5-197810 A | 8/1993 |
| JP | 06-110608 | 4/1994 |
| JP | 7-110733 A | 4/1995 |
| JP | 7-230352 A | 8/1995 |
| JP | 8-016931 B2 | 2/1996 |
| JP | 8-108689 A | 4/1996 |
| JP | 8-240407 A | 9/1996 |
| JP | 8-315152 A | 11/1996 |
| JP | 9-091094 A | 4/1997 |
| JP | 9-224111 A | 8/1997 |
| JP | 9-319501 A | 12/1997 |
| JP | 10-105324 A | 4/1998 |
| JP | 11-051644 A | 2/1999 |
| JP | 11-064026 A | 3/1999 |
| JP | 11-085376 A | 3/1999 |
| JP | 11-110116 A | 4/1999 |
| JP | 11-203042 | 7/1999 |
| JP | 11-212692 | 8/1999 |
| JP | 2000-105671 A | 4/2000 |
| JP | 2000-132340 A | 5/2000 |
| JP | 2001-075735 A | 3/2001 |
| JP | 2001-142642 | 5/2001 |
| JP | 2001-282456 A | 10/2001 |
| JP | 2001-282457 A | 10/2001 |
| JP | 2002-055770 | 2/2002 |
| JP | 2002-236547 A | 8/2002 |
| JP | 2003-65716 A | 3/2003 |
| JP | 2003-158597 A | 5/2003 |
| JP | 2003-167669 A | 6/2003 |
| JP | 2003-173237 A | 6/2003 |
| JP | 2005-108211 A | 4/2005 |
| JP | 2005-182423 A | 7/2005 |
| JP | 2005-202950 A | 7/2005 |
| WO | 98/07112 A2 | 2/1998 |
| WO | 99/08897 A1 | 2/1999 |
| WO | 99/21122 A1 | 4/1999 |
| WO | 99/28812 A1 | 6/1999 |
| WO | 99/40562 A1 | 8/1999 |
| WO | 01/24157 A1 | 4/2001 |
| WO | 01/31570 A2 | 5/2001 |
| WO | 01/63550 A2 | 8/2001 |
| WO | 01/91043 A2 | 11/2001 |
| WO | 02/03316 A1 | 1/2002 |
| WO | 02/07073 A2 | 1/2002 |
| WO | 02/27461 A1 | 4/2002 |
| WO | 03/104887 A2 | 12/2003 |
| WO | 03/105074 A2 | 12/2003 |
| WO | 2004/072843 A2 | 8/2004 |
| WO | 2004/090706 A2 | 10/2004 |
| WO | 2004/102523 A1 | 11/2004 |
| WO | 2004/104810 A1 | 12/2004 |
| WO | 2005/031554 A1 | 4/2005 |
| WO | 2005034027 A1 | 4/2005 |
| WO | 2005/106775 A1 | 11/2005 |
| WO | 2005/107072 A1 | 11/2005 |
| WO | 2006/002544 A1 | 1/2006 |
| WO | 2006/092058 A1 | 9/2006 |
| WO | 2006/095320 A2 | 9/2006 |
| WO | 2006/096962 A1 | 9/2006 |
| WO | 2006/116869 A1 | 11/2006 |
| WO | 2007/003196 A2 | 1/2007 |
| WO | 2007/019600 A1 | 2/2007 |
| WO | 2007/037809 | 4/2007 |
| WO | 2007/064804 A1 | 6/2007 |
| WO | 2007/079590 | 7/2007 |
| WO | 2007/132033 A1 | 11/2007 |
| WO | 2007/134456 A1 | 11/2007 |
| WO | 2008/128096 A2 | 10/2008 |
| WO | 2009/029764 A1 | 3/2009 |
| WO | 2009/029767 A1 | 3/2009 |
| WO | 2009/146544 A1 | 12/2009 |
| WO | 2010/051633 A1 | 5/2010 |

OTHER PUBLICATIONS

Villamor et al. "Touch Gesture Reference Guide", Apr. 15, 2010.
International Search Report for PCT/CA2008/001350 mailed Oct. 17, 2008 (5 Pages).
International Search Report and Written Opinion for PCT/CA2007/002184 mailed Mar. 13, 2008 (13 Pages).
International Search Report and Written Opinion for PCT/CA2004/001759 mailed Feb. 21, 2005 (7 Pages).
International Search Report for PCT/CA01/00980 mailed Oct. 22, 2001 (3 Pages).
International Search Report and Written Opinion for PCT/CA2009/000773 mailed Aug. 12, 2009 (11 Pages).
European Search Opinion for EP 07 25 0888 dated Jun. 22, 2007 (2 pages).
European Search Report for EP 07 25 0888 dated Jun. 22, 20067 (2 pages).
European Search Report for EP 06 01 9269 dated Nov. 9, 2006 (4 pages).
European Search Report for EP 06 01 9268 dated Nov. 9, 2006 (4 pages).
European Search Report for EP 04 25 1392 dated Jan. 11, 2007 (2 pages).
European Search Report for EP 02 25 3594 dated Dec. 14, 2005 (3 pages).
Partial European Search Report for EP 03 25 7166 dated May 19, 2006 (4 pages).
May 12, 2009 Office Action for Canadian Patent Application No. 2,412,878 (4 pages).
Förstner, Wolfgang, "On Estimating Rotations", Festschrift für Prof. Dr. -Ing. Heinrich Ebner Zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).
Funk, Bud K., CCD's in optical panels deliver high resolution, Electronic Design, Sep. 27, 1980, pp. 139-143.
Hartley, R. and Zisserman, A., "Multiple View Geometry in Computer Vision", Cambridge University Press, First published 2000, Reprinted (with corrections) 2001, pp. 70-73, 92-93, and 98-99.
Kanatani, K., "Camera Calibration", Geometric Computation for Machine Vision, Oxford Engineering Science Series, vol. 37, 1993, pp. 56-63.
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.
Wang, F., et al., "Stereo camera calibration without absolute world coordinate information", SPIE, vol. 2620, pp. 655-662, Jun. 14, 1995.
Wrobel, B., "minimum Solutions for Orientation", Calibration and Orientation of Cameras in Computer Vision, Springer Series in Information Sciences, vol. 34, 2001, pp. 28-33.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).

"White Paper", Digital Vision Touch Technology, Feb. 2003.
International Preliminary Report on Patentability, PCT/NZ2004/000029, May 20, 2005 (21 pages).
"International Preliminary Report on Patentability", PCT/US2008/060102, Oct. 22, 2009 (9 pages).
International Search Report for PCT/CA2010/001085 mailed Oct. 12, 2010 (5 pages).
"International Application Serial No. PCT/US2008/060102, Search Report & Written opinion mailed Feb. 12, 2009" (14 pages).
International Application Serial No. PCT/US2008/074749, Search Report & Written Opinion mailed Feb. 11, 2009 (10 pages).
"International Application Serial No. PCT/US2008/074755, International Search Report and Written Opinion mailed Jan. 29, 2009" (14 pages).
International Search Report for PCT/NZ05/00092 Sep. 27, 2006 (4 pages).
Loinaz et al., "A 200-mW, 3.3-V, CMOS Color Camera IC Producing 352×288 24-B Video at 30 Frames/s," IEEE Journal of Solid-StateCircuits,vol. 31,No. 12,Dec. 1998, pp. 2092-2103.

Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
*Touch Panel*, vol. 5 No. 2-3 (Sep. 2010).
*Touch Panel*, vol. 5 No. 4 (Nov. 2010).
"Store Window Presentations", Heddier Electronic; 2004.
"ThruGlass", Projected Capacitive Touchscreencs Specifications, Micro Touch; 2000.
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip for Multimedia Applications, Photobit Corporation, 1999 (2 pages).

* cited by examiner

SIZE/SCALE ORIENTATION DETERMINATION OF A POINTER IN A CAMERA-BASED TOUCH SYSTEM

This application is a continuation of U.S. patent application Ser. No. 11/236,622, filed Sep. 28, 2005, now U.S. Pat. No. 7,619,617, which is a continuation of U.S. patent application Ser. No. 10/294,917, filed Nov. 15, 2002, now U.S. Pat. No. 6,954,197, the contents of which are incorporated herein by reference

FIELD OF THE INVENTION

The present invention relates generally to camera-based touch systems and in particular to a method of determining the size/scale and orientation of a pointer in a camera-based touch system and to a camera-based touch system employing pointer size/scale and orientation determination.

BACKGROUND OF THE INVENTION

Camera-based touch systems that use optical recording devices such as cameras to acquire images of a touch surface and process the image data to determine the position of a pointer relative to the touch surface are known. For example, International PCT Application No. WO 02/03316 to Smart Technologies Inc. et al discloses a camera-based touch system including a touch surface and a plurality of cameras associated with the touch surface. The cameras have overlapping fields of view encompassing the touch surface. The cameras acquire images of the touch surface from different locations and generate image data. Processing circuitry receives and processes the image data generated by the cameras to determine the location of a pointer captured in the images relative to the touch surface using triangulation.

In particular, a processor associated with each camera receives the image data generated by the camera and processes the image data to detect the existence of the pointer in the image. Pointer information packets (PIPs) are generated by the camera processors when the pointer exists in the captured images. The PIPs, among other things, identify the pointer and either its tip or its median line. The tip or median line data in the PIPs is then processed by a master controller to determine the position of the pointer relative to the touch surface using triangulation.

Although the above-identified camera-based touch system provides significant advantages over other types of prior art passive touch systems such as analog resistive, surface acoustic wave and capacitive touch systems, improvements are always desired. Since the above-described camera-based touch system uses single point triangulation to determine the position of the pointer relative to the touch surface, resolution is limited. In addition, the camera-based touch system does not readily provide for resolution of pointer ambiguity. Accordingly, there is a need for an improved camera-based touch system.

It is therefore an object of the present invention to provide a novel method of determining the size/scale and orientation of a pointer in a camera-based touch system and to a camera-based touch system employing pointer size/scale and orientation determination.

SUMMARY OF THE INVENTION

According to one aspect of the present invention there is provided a touch system comprising:

at least two optical devices associated with a touch surface, said at least two optical recording devices acquiring images of said touch surface from different locations and having overlapping fields of view; and processing circuitry processing image data acquired by said at least two optical recording devices to detect edges of a pointer in said images and to triangulate the detected edges to determine a bounding area that defines a pointer perimeter.

Preferably, the processing circuitry further determines the center of the bounding area thereby to determine the center of the pointer. It is also preferred that the processing circuitry examines the shape of the bounding area to determine the orientation of the pointer relative to the touch surface.

In one embodiment, the touch surface is generally rectangular and an optical recording device is positioned adjacent each corner of the touch surface. The processing circuitry triangulates detected edges in images captured by multiple pairs of optical recording devices to yield multiple bounding areas. The smallest bounding area is selected as the bounding area defining the pointer perimeter. The processing circuitry averages the centers of the multiple bounding areas to determine the center of the pointer.

In a preferred form, the optical recording devices are CMOS digital cameras having selectable pixels arrays. Pixel data from subsets of the pixel arrays is processed by the processing circuitry. The processing circuitry includes a camera processor associated with each digital camera to process pixel data and detect edges of the pointer. A master processor triangulates the detected edges to yield the multiple bounding areas and selects the smallest bounding area as the bounding area representing the pointer perimeter.

Preferably pixel data at least from pixel rows capturing the region of the pointer in contact with the touch surface is processed to determine the bounding area. It is further preferred that pixel data from pixel rows capturing regions of the pointer along its length are processed to yield a series of bounding areas, the bounding areas being stacked to generate a volumetric representation of the pointer.

In another embodiment, the processing circuitry superimposes a model over the bounding area with the model defining the pointer perimeter. The processing circuitry examines parameters of the model thereby to determine the center or tip location of the pointer. The model may take the form of a rectangular box centered over the bounding area.

According to another aspect of the present invention there is provided a touch system comprising:

at least two digital cameras associated with a touch surface, said at least two digital cameras acquiring images of said touch surface from different locations and having overlapping fields of view; and processing circuitry processing pixel data acquired by said at least two digital cameras to detect edges of a pointer in said images and to triangulate the detected edges to determine at least one bounding area that represents a pointer perimeter.

According to yet another aspect of the present invention there is provided a touch system comprising:

a touch surface;

at least two cameras associated with said touch surface, said at least two cameras acquiring images of said touch surface from different locations and having overlapping fields of view;

a digital signal processor associated with each camera, the digital signal processors associated with said at least two cameras processing pixel data acquired by selected pixel subsets of the at least two digital cameras to generate pointer characteristic data when a pointer exists in said acquired images, said pointer characteristic data identifying edges of said pointer; and a master digital signal processor triangulating the edge information in said pointer characteristic data to determine a bounding area defining a pointer perimeter.

According to still yet another aspect of the present invention there is provided a method of detecting the perimeter of a pointer relative to a touch surface comprising the steps of:

acquiring multiple images of a pointer relative to said touch surface;

processing pixel data resulting from said images to detect edges of said pointer; and triangulating the detected edges to determine a bounding area representing said perimeter.

According to still yet another aspect of the present invention there is provided a method of erasing electronic ink presented on a touch surface in response to movement of a pointer over said touch surface, said method comprising the steps of:

tracking movement of said pointer over said touch surface;

determining the perimeter of the pointer that is in contact with said touch surface; and erasing electronic ink contacted by said determined perimeter.

Since two or more cameras acquire an image of the pointer when the pointer is adjacent the touch surface, the edge co-ordinates of the pointer generated by each camera define a bounding area that represents the pointer perimeter. The size and the orientation of the bounding area allows the size and orientation of the pointer to be determined. In addition, parameters of the bounding area can be used to determine the center or tip location of the pointer. Using this bounding area data to locate the pointer tip provides increased pointer position determination accuracy than is achievable using single point triangulation. This is due to the fact that by selecting the minimum bounding area, noise in the captured images that can create jitter, is reduced.

The present invention provides further advantages in that when more than two cameras are used, if one of the triangulation camera pairs yields a poor bounding area result, the other triangulation camera pairs are automatically used to determine the bounding area.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
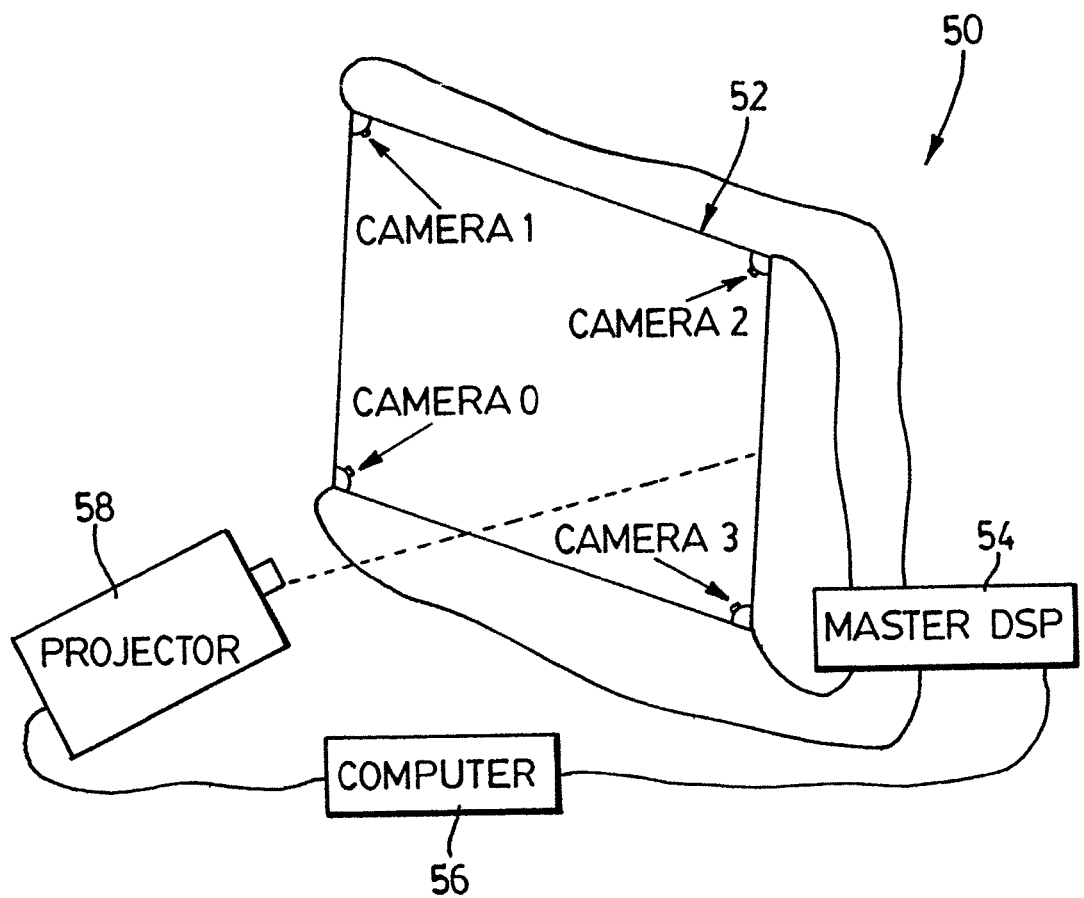
FIG. 1 is a schematic diagram of a camera-based touch system in accordance with the present invention.

Turning now to FIG. 1, a camera-based touch system such as that described in International PCT No. WO 02/03316 filed on Jul. 5, 2001, assigned to the assignee of the present invention, the contents of which are incorporated herein by reference, is shown and is generally identified by reference numeral 50. As can be seen, touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts with the touch screen 52 can be recorded as writing, drawing or erasing or can be used to control execution of application programs executed by the computer 56. In the case of writing or drawing, electronic ink corresponding to pointer movement over the touch screen is presented. In the case of erasing, presented electronic ink contacted by the pointer is removed.

Figure 2:
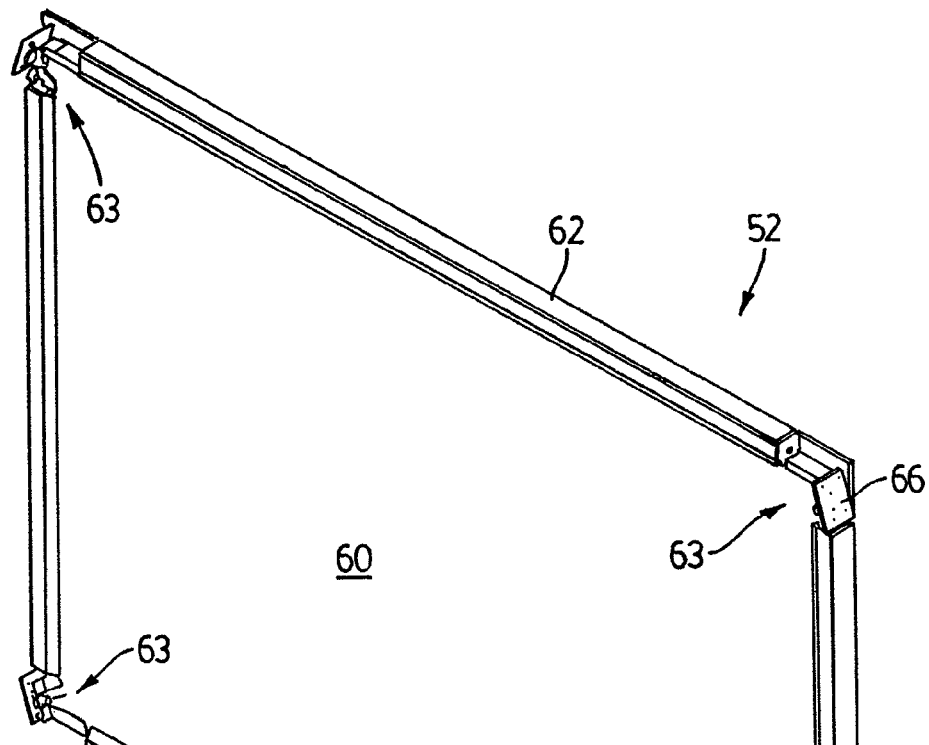
FIG. 2 is an isometric view of a touch screen forming part of the touch system of FIG. 1.
Figure 3:
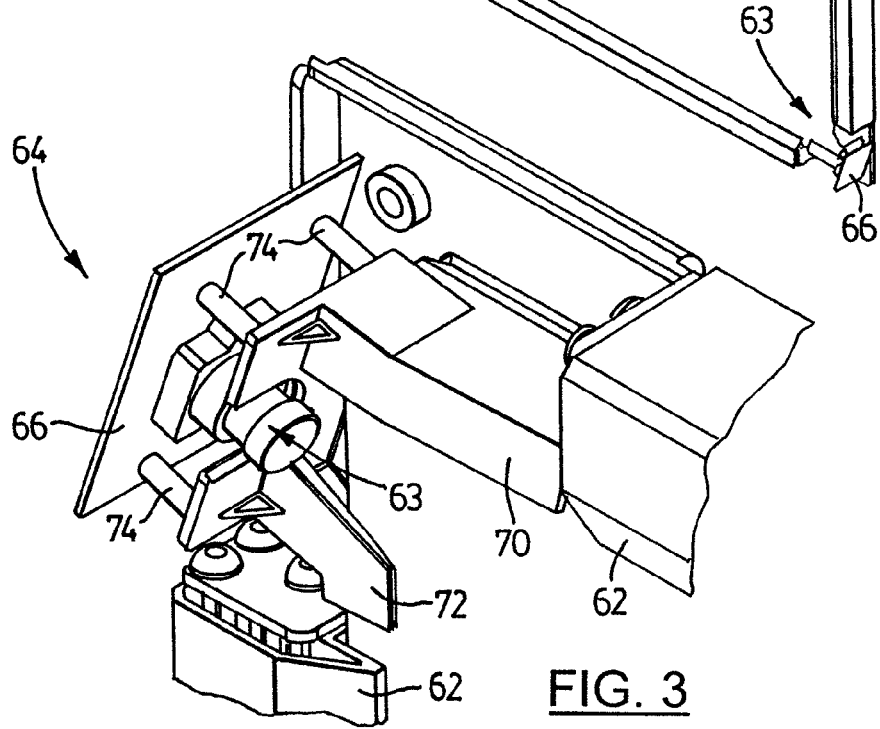
FIG. 3 is an isometric view of a corner portion of the touch screen of FIG. 2.
Figure 4:
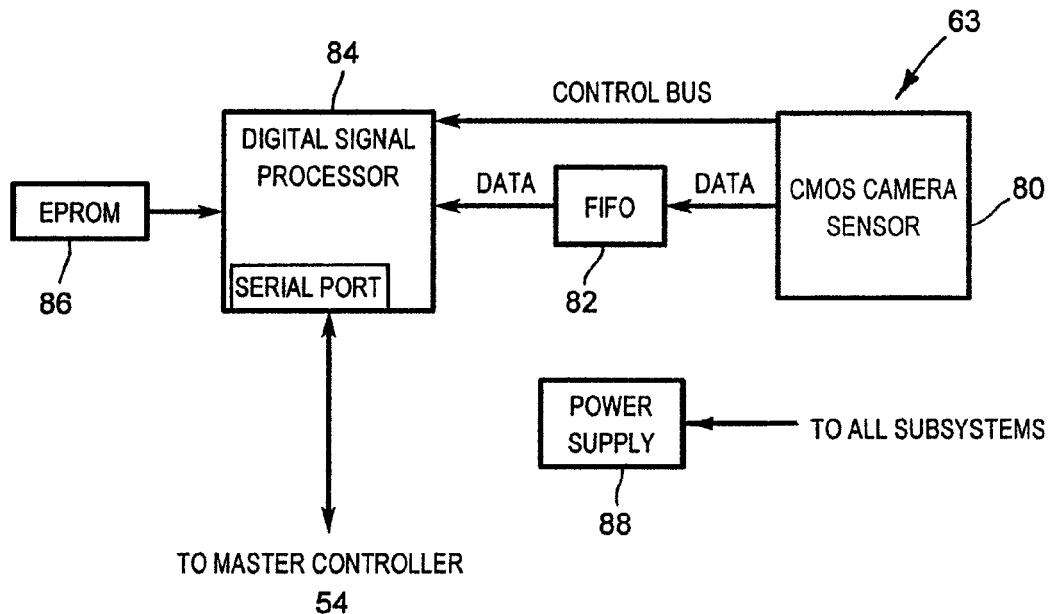
FIG. 4 is a schematic diagram of a digital camera forming part of the touch screen of FIG. 2.

FIGS. 2 to 4 better illustrate the touch screen 52. Touch screen 52 includes a touch surface 60 bordered by a rectangular frame or bezel 62. Touch surface 60 is in the form of a rectangular planar sheet of passive material but may in fact be any suitable surface. Optical recording devices in the form of DSP-based CMOS digital cameras $63_0$ to $63_3$ are positioned adjacent each corner of the touch screen 52. Each digital camera $63_N$ is mounted on a frame assembly 64. Each frame assembly 64 includes an angled support plate 66 on which the digital camera $63_N$ is mounted. Supporting frame elements 70 and 72 are mounted on the plate 66 by way of posts 74 and secure the plate 66 to the frame 62.

Each digital camera $63_N$ includes a two-dimensional CMOS image sensor 80 having an associated lens assembly, a first-in-first-out (FIFO) buffer 82 coupled to the image sensor 80 by a data bus and a digital signal processor (DSP) 84 coupled to the FIFO 82 by a data bus and to the image sensor 80 by a control bus. A boot EPROM 86 and a power supply subsystem 88 are also included.

In the present embodiment, the CMOS camera image sensor 80 is a National LM9617 image sensor configured for a 640×20 pixel subarray that can be operated to capture image frames at rates in excess of 200 frames per second. Arbitrary pixel rows of the image sensor 80 can be selected. Since the pixel rows can be arbitrarily selected, the pixel subarray can be exposed for a greater duration for a given digital camera frame rate providing for good operation in darker rooms in addition to well lit rooms. The FIFO buffer 82 is manufactured by Cypress under part number CY7C4211V and the DSP 84 is manufactured by Analog Devices under part number ADSP2185M.

The DSP 84 receives and processes image frames from the image sensor 80 to determine the edges of a pointer within the image frames. In addition, the DSP 84 provides control information to the image sensor 80 via the control bus. The control information allows the DSP 84 to control perimeters of the image sensor 80 such as exposure, gain, array configuration, reset and initialization. The DSP 84 also provides clock signals to the image sensor 80 to control the frame rate of the image sensor 80.

Figure 6:
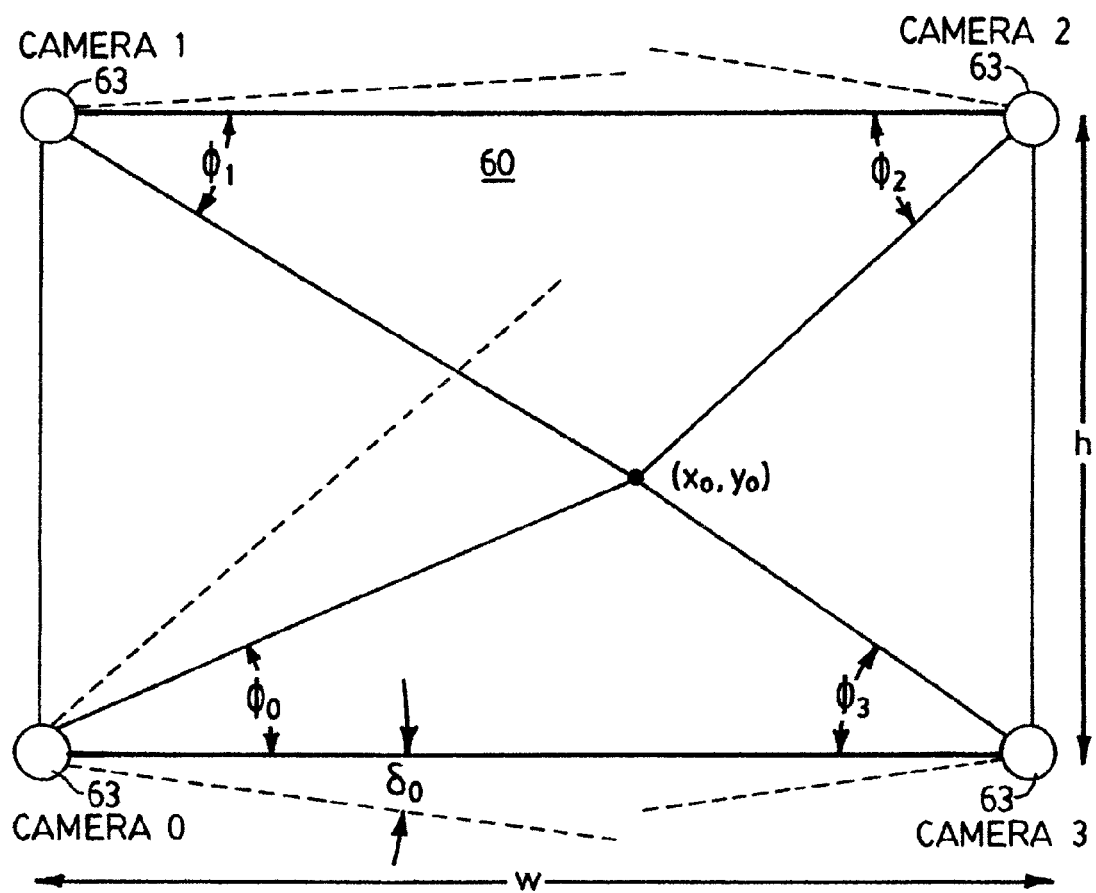
FIG. 6 shows triangulation geometry used to calculate a pointer contact position on the touch surface of the touch screen.

The angle of the plate 66 and the optics of the digital cameras $63_N$ are selected so that the field of view (FOV) of each digital camera $63_N$ is slightly beyond 90°. In this way, the entire touch surface 60 is within the field of view of each digital camera $63_N$ with the field of view of each digital camera $63_N$ extending slightly beyond a designated peripheral edge of the touch surface 60 as shown in FIG. 6.

Figure 5:
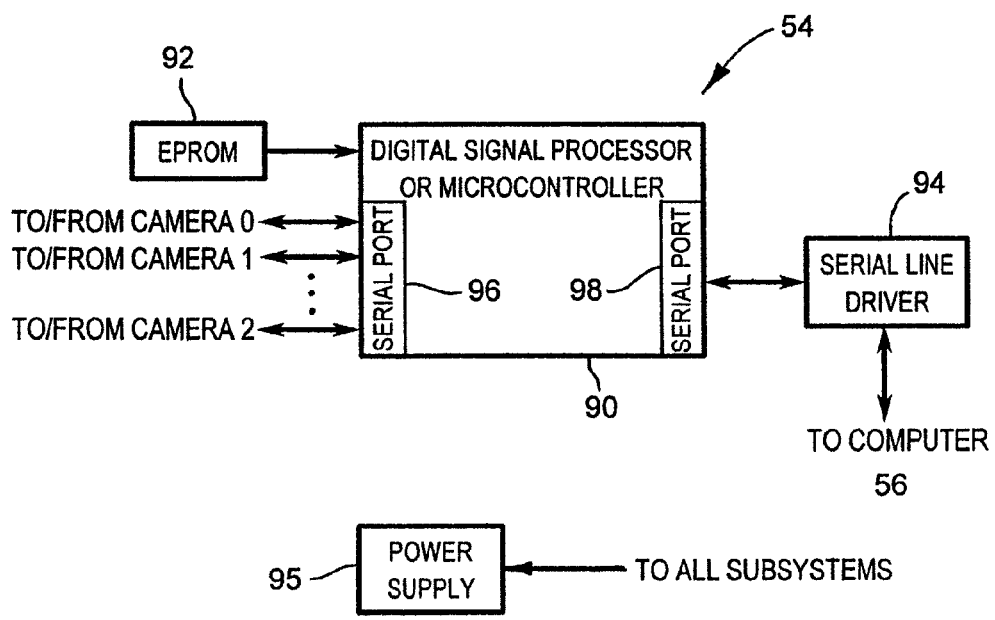
FIG. 5 is a schematic diagram of a master controller forming part of the touch system of FIG. 1.

Master controller 54 is best illustrated in FIG. 5 and includes a DSP 90, a boot EPROM 92, a serial line driver 94 and a power supply subsystem 95. The DSP 90 communicates with the DSPs 84 of the digital cameras 63₀ to 63₃ over a data bus via a serial port 96 and communicates with the computer 56 over a data bus via a serial port 98 and the serial line driver 94. In this embodiment, the DSP 90 is manufactured by Analog Devices under part number ADSP2185M. The serial line driver 94 is manufactured by Analog Devices under part number ADM222.

The master controller 54 and each digital camera 63$_N$ follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras 63₀ to 63₃ and to the DSP 90 in the master controller 54 and the remaining two (2) channels are unused.

The master controller 54 monitors the twenty-four (24) channels assigned to the DSPs 84. The DSPs 84 monitor the six (6) channels assigned to the DSP 90 of the master controller 54. Communications between the master controller 54 and the digital cameras 63₀ to 63₃ are performed as background processes in response to interrupts.

The operation of the touch system 50 will now be described. Initially, a camera offset angle calibration routine is performed to determine the offset angle δ of each digital camera 63$_N$ (see FIG. 6). Details of the camera offset angle calibration are described in Applicants' co-pending U.S. application Ser. No. 09/870,698 entitled "Calibrating Camera Offsets to Facilitate Object Position Determination Using Triangulation" filed on Jun. 1, 2001, the contents of which are incorporated herein by reference.

With the touch system 50 calibrated, each digital camera 63$_N$ acquires image frames of the touch surface 60 within the field of view of its image sensor 80 at a desired frame rate and loads the pixel data associated with the selected pixel subarray into the FIFO buffer 82. The DSP 84 in turn reads the pixel data from the FIFO buffer 82 and processes the pixel data to determine if a pointer exists in the image frame.

If a pointer is in the acquired image frame, the pixel data is further processed by the DSP 84 to determine the edges of the pointer visible to the digital camera 63$_N$ in each pixel row of the subarray. In the present embodiment, a combination of image contrast with a differentiating edge detector is used. Specifics concerning edge detection can be found in "The Image Processing Handbook", Fourth Edition by John C. Russ, CRC Press, Publication Date: Jul. 26, 2002, Chapter 4: Image Enhancement and in "Algorithms for Image Processing and Computer Vision" by J. R. Parker, Wiley Computer Publishing, Publication Date: 1997, Chapter 1: Advanced Edge Detection Techniques. The z-position of the pointer is also determined so that a determination can be made as to whether the pointer is contacting or hovering above the touch surface 60. Pointer information packets (PIPs), including the pointer edge and contact or hover data, status and/or diagnostic information, are then generated by the DSP 84 and the PIPs are queued for transmission to the master controller 54. The digital cameras 63₀ to 63₃ also receive and respond to command PIPs generated by the master controller 54.

The master controller 54 polls the digital cameras 63₀ to 63₃ for PIPs in the queues. In this particular embodiment, the master controller 54 polls the digital cameras at a rate exceeding the image sensor frame rates. Upon receipt of PIPs from the digital cameras 63$_N$, the master controller 54 examines the PIPs to determine if the PIPs include pointer edge data. If the PIPs include pointer edge data, the master controller 54 triangulates the pointer edge data in the PIPs to determine bounding areas in which the pointer is located.

During triangulation, triangulation is performed in respect of each pair of cameras capturing images of the pointer with the exception of the diagonal digital camera pairs and for each pixel row to yield a plurality of bounding areas. The minimum bounding area, which may range from a four-sided polygon to an eight-sided polygon, for each pixel row is then selected to reduce the effects of erroneous or suboptimal measurements. Once the minimum bounding area for each pixel row has been selected, a model, in the present embodiment a rectangular box whose size is a function of the size of the minimum bounding area, is superimposed on the bounding area and defines the pointer perimeter and hence pointer size at that pixel row. The size of the box describes the pointer size in terms of pixels by height and width.

In order to determine the centre of the pointer at a selected pixel row, the parameters of the model such as its center, superimposed on each bounding area is determined and the centers are averaged to determine the pointer center in sub-pixel accuracy.

The size and orientation of the model superimposed on the smallest bounding area for each pixel row is used by the master controller 54 to determine the size and orientation of the pointer. Knowing the size of pointer helps to reduce pointer ambiguity. If there is prior knowledge concerning the pointer size, then the acquired bounding areas can be used to identify quickly potential pointers from other objects captured in the camera images. Objects that are too large or too small as compared to the historical pointer size can be discarded as erroneous.

Knowing the orientation of the pointer can be important depending on the shape of the pointer. If the bounding area is circular, the pointer is a cylindrical and pointer orientation is not important. However, if the bounding area is rectangular in shape then pointer orientation becomes important. For example in the case of a pointer in the form of a standard rectangular chalk board eraser, if the longest side of the rectangular eraser runs up and down, then it can be determined that the eraser is held in a vertical orientation. Likewise if the longest side of the rectangular eraser runs left to right, then it can be determined that the eraser is held in a horizontal orientation. Being able to determine pointer orientation is particularly beneficial when performing an erasing function since erasing can be limited to the pointer perimeter contacting the touch surface regardless of the pointer size. This is substantially different from single point contact touch systems that erase a predefined area surrounding a touch surface contact irrespective of pointer size and orientation.

The master controller 54 also calculates a volumetric representation of the pointer by examining the model superimposed on the minimum bounding area associated with each pixel row of the subarray. Changes in size of the model enable the configuration of the pointer to be determined. For example, in the case of a conical pointer, the pixel row capturing pixel data associated with the tip of the pointer, yields a small bounding area and an equally small model. Pixel rows capturing pixel data associated with the pointer body away from the pointer tip, yield larger bounding areas as the pointer broadens and therefore equally larger models. This change in model size allows the master controller 54 to determine the conical configuration of the pointer.

In the case of a pointer such as a finger that has a generally cylindrical shape, especially when the finger is pressed and flattened against the touch surface, the pixel rows capturing pixel data along the length of the finger, yield bounding areas and corresponding models that are basically the same size. This allows the master controller 54 to determine the cylindrical configuration of the pointer. As will be appreciated, by stacking the bounding areas or models generated for a series of pixel rows, a three-dimensional volumetric representation of the pointer can be constructed allowing the pointer type to be determined.

Once the master controller 54 has determined the pointer perimeter and the pointer orientation, the master controller 54 transmits the calculated pointer perimeter and orientation data, status and/or diagnostic information to the computer 56. In this manner, the pointer perimeter and orientation data transmitted to the computer 56 can be recorded as writing, drawing or erasing or can be used to control execution of application programs executed by the computer 56. The computer 56 also updates the display output conveyed to the projector 58 so that information presented on the touch surface 60 reflects the pointer activity. The master controller 54 also receives commands from the computer 56 and responds accordingly as well as generates and conveys command PIPs to the digital cameras $63_N$.

Figure 7:
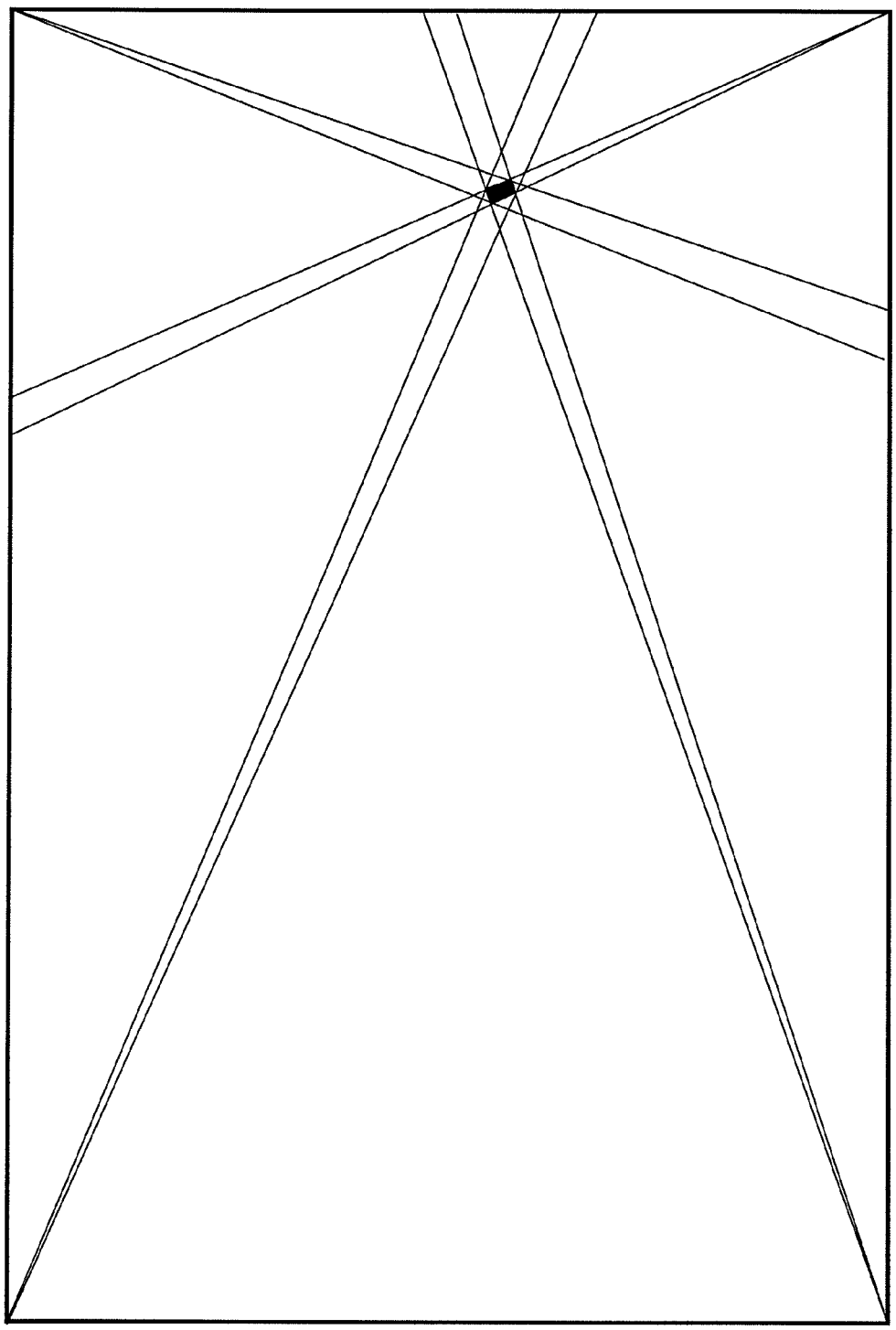
FIGS. 7 to 9 are graphical representations of overlapping triangulated pointer edges defining bounding areas generated in response to contacts on the touch surface using different type pointers, models in the form of shaded rectangular boxes being superimposed on the bounding areas.
Figure 8:
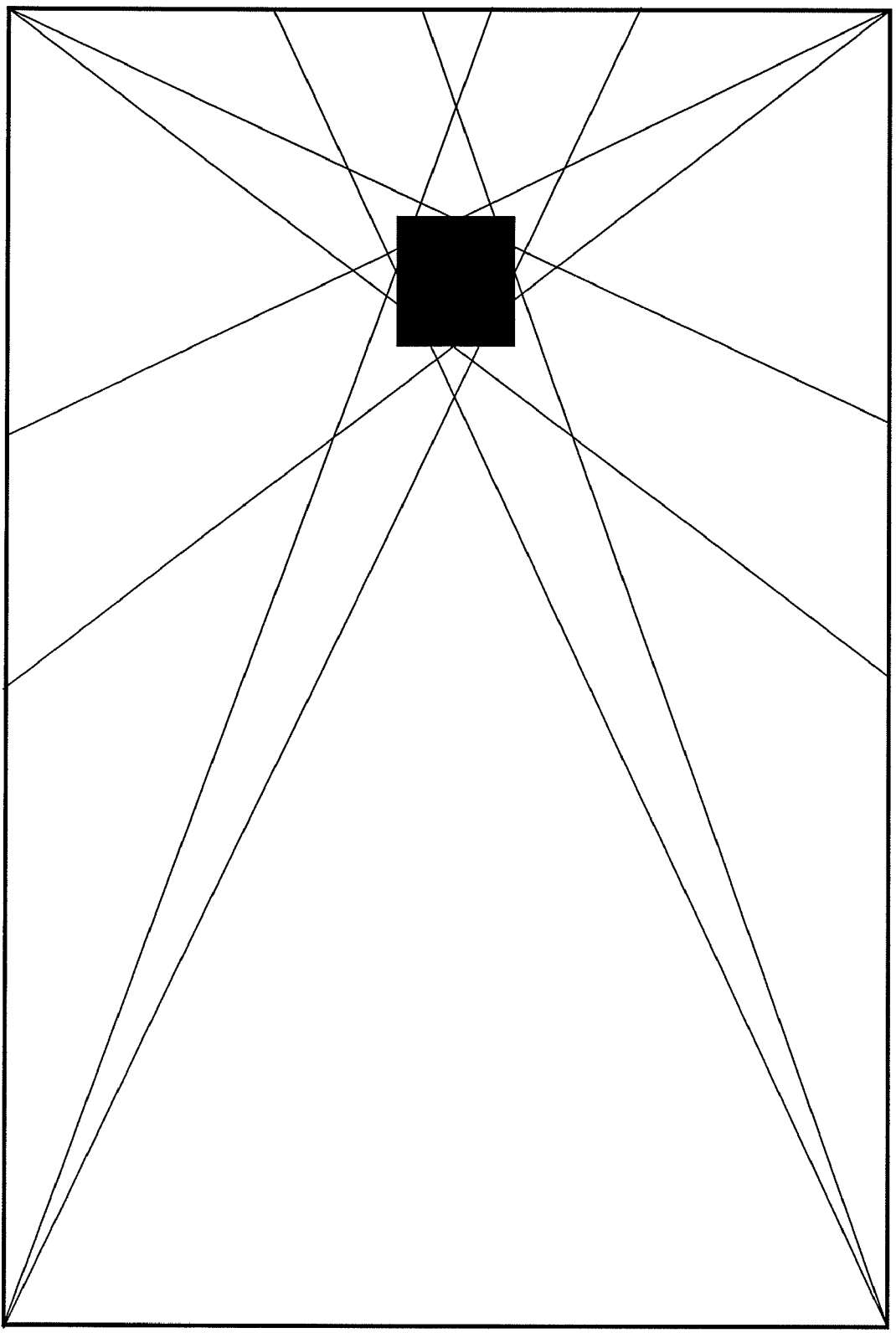
Figure 9:
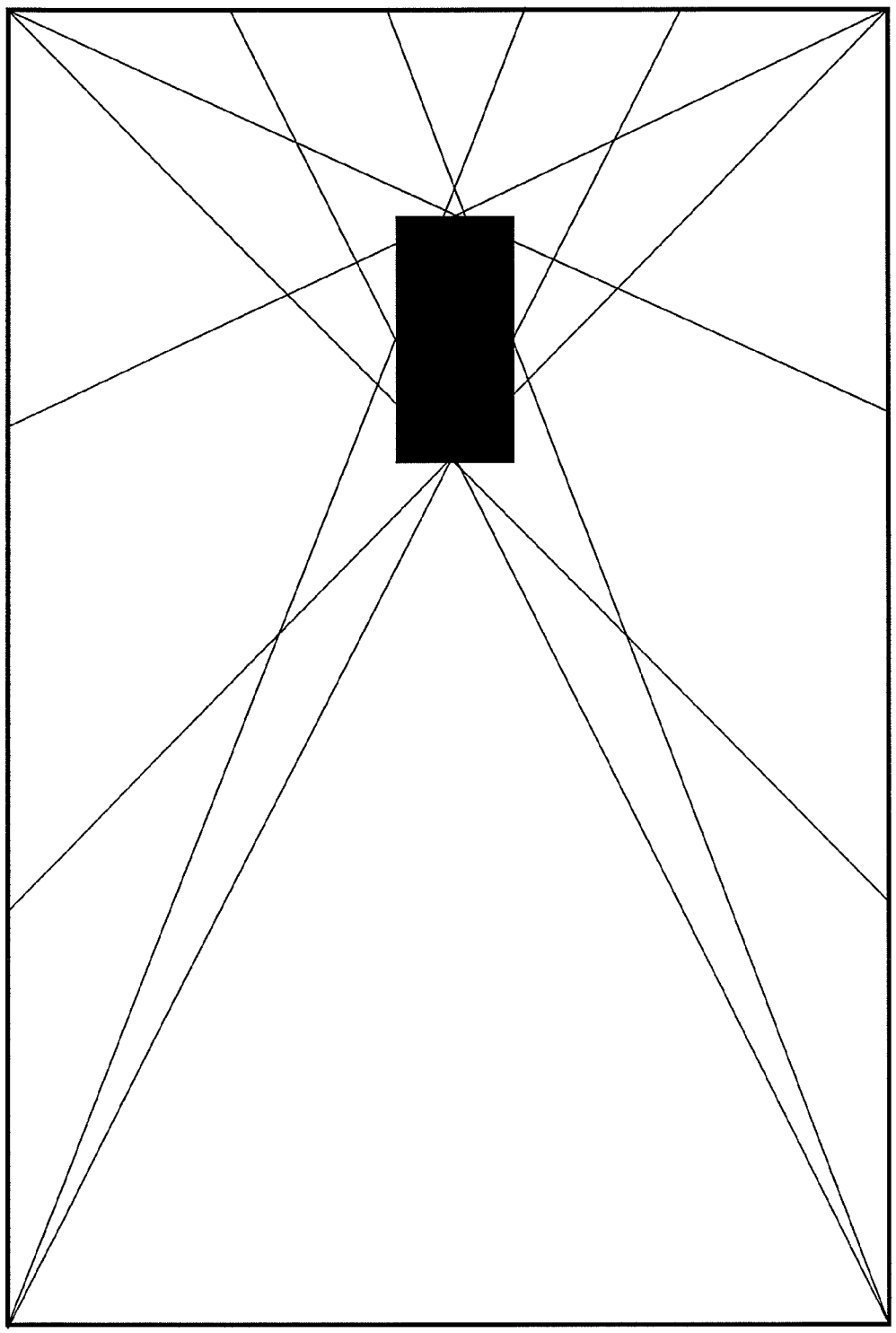

Turning now to FIGS. 7 to 9, graphical representations of overlapping triangulated edges defining bounding areas are shown. As can be seen, the bounding areas are not box-shaped but actually take the form of multi-sided polygons with the number of sides of the polygons ranging from four when using PIPs generated by a pair of cameras to eight when using PIPs generated by four cameras. In FIG. 7, the bounding area is generated as a result of a finger contacting the touch surface. In FIG. 8, the bounding area is generated as a result of a hockey puck contacting the touch surface. In FIG. 9, the bounding area is generated as a result of a rectangular eraser contacting the touch surface with the longest side of the eraser being in the horizontal orientation. As will be appreciated, this Figure clearly shows how pointer orientation can be used and in this case defines an erase tool perimeter of the correct size and orientation.

Figure 10:
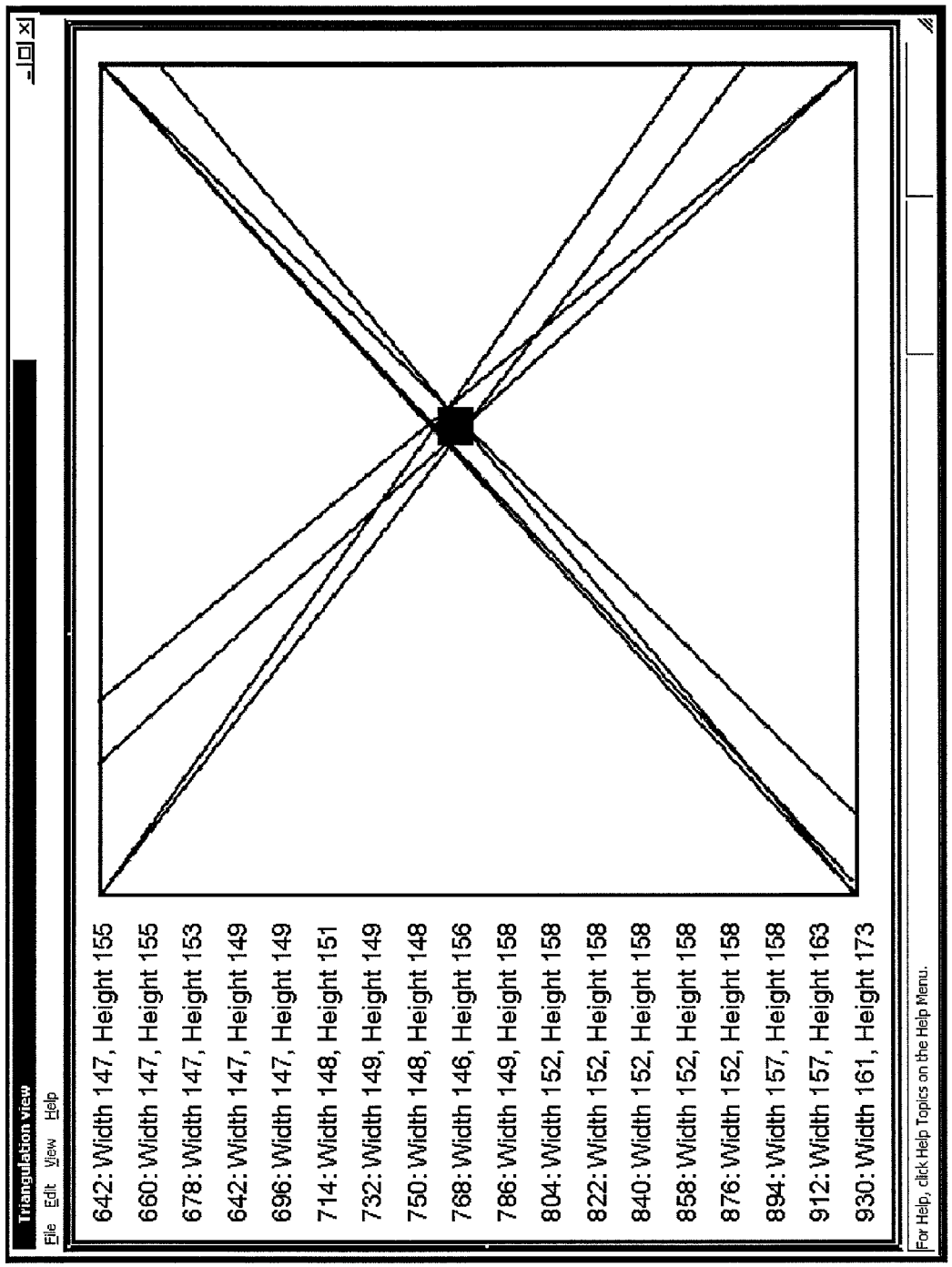
FIGS. 10 and 11 are screen shots generated by a diagnostic program showing the size, orientation and relative scale of different pointers contacting the touch surface.
Figure 11:
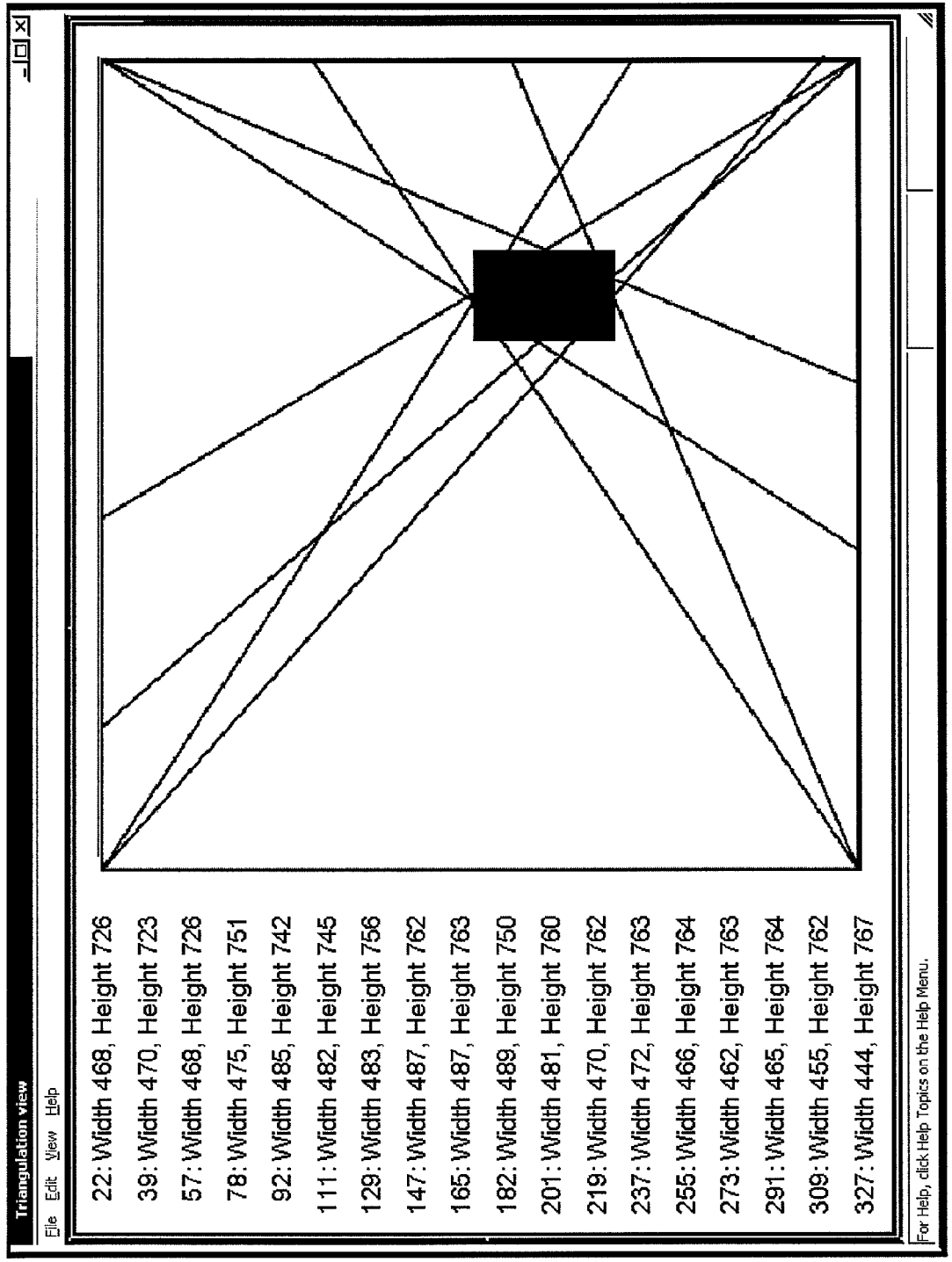

FIGS. 10 and 11 are screen shots generated by a diagnostic program showing the size, orientation and relative scale of different pointers contacting the touch surface. In particularly, FIG. 10 shows a small pointer of uniform width and height contacting the touch surface. The size of the pointer is 161×173 pixels. FIG. 11 shows a different pointer in contact with the touch surface. The size of the pointer in this case is 444×767 pixels.

Although a box-shaped rectangular model is shown superimposed over the bounding areas, those of skill in the art will appreciate that other model shapes may be used. Alternatively, the shapes of the bounding areas may be used to define the pointer perimeters. The center of the pointer can likewise be calculated by averaging the centers of the bounding areas. Also, although the master controller is shown as a separate processor, one of the camera processors may perform the master controller function and receive PIPs from the other camera processors.

As previously described in order to generate a three-dimensional volumetric representation of the pointer, the bounding area or model associated with each pixel row of the subarray is placed in a stack and the sizes of the bounding areas or models are compared. Of course only selected bounding areas or models need be examined. Also, if only pointer contact with the touch surface is of concern, triangulation need only be performed for the pixel row looking directly along the touch surface. In this manner, only the pointer perimeter at the touch surface contact point is defined.

Although preferred embodiments of the present invention have been described, those of skill in the art will appreciate that variations and modifications may be made without departing from the spirit and scope thereof as defined by the appended claims.

What is claimed is:

1. A method comprising:
acquiring at least first and second images of a pointer proximate an input surface from different vantages;
processing pixel data of each image to determine edges of said pointer;
calculating an input area of said pointer using triangulation based on the determined edges, the input area representing the size of said pointer; and
updating a computer generated image displayed on said input surface based at least in part on the pointer size.

2. The method of claim 1 further comprising determining the center of the input area thereby to determine the center of said pointer.

3. The method of claim 1 further comprising examining the shape of the input area to determine the orientation of said pointer relative to said input surface.

4. The method of claim 2 further comprising examining the shape of the input area to determine the orientation of said pointer relative to said input surface.

5. The method of claim 1 wherein said input surface is generally rectangular, wherein said acquiring comprises acquiring an image looking generally across said input surface from each corner of said input surface, and wherein said calculating comprises calculating an input area based on said determined edges for different pairs of images and using the smallest input area to represent the size of said pointer.

6. The method of claim 5 further comprising averaging the centers of the calculated input areas to determine the center of said pointer.

7. The method of claim 1 wherein said processing is performed at a rate greater than the rate at which said images are acquired.

8. The method of claim 1 further comprising superimposing a model over said input area.

9. The method of claim 8 further comprising determining the center of said model thereby to determine the center of said pointer.

10. The method of claim 8 further comprising examining the size of said model to identify non-pointer input.

11. A method comprising:
acquiring at least first and second images looking generally across an input surface from different vantages;
processing pixel data of each image to determine if a pointer exists in said image and if so, processing pixel data to determine edges of said pointer;
calculating an input region of said pointer using triangulation based on the determined edges; and
in response to the calculated input region, updating a computer generated image displayed on said touch surface.

12. The method of claim 11 further comprising determining the center of the input region thereby to determine the center of said pointer.

13. The method of claim 11 further comprising examining the shape of the input region to determine the orientation of said pointer relative to said input surface.

14. The method of claim 12 further comprising examining the shape of the input region to determine the orientation of said pointer relative to said input surface.

15. The method of claim 11 wherein said input surface is generally rectangular, wherein said acquiring comprises acquiring an image looking generally across said input surface from each corner of said input surface, and wherein said calculating comprises calculating an input region based on said determined edges for different pairs of images and using the smallest input region to represent the size of said pointer.

16. The method of claim 15 further comprising averaging the centers of the calculated input regions to determine the center of said pointer.

17. The method of claim 11 wherein said processing is performed at a rate greater than the rate at which said images are acquired.

18. The method of claim 11 further comprising superimposing a model over said input region.

19. The method of claim 18 further comprising determining the center of said model thereby to determine the center of said pointer.

20. The method of claim 18 further comprising examining the size of said model to identify non-pointer input.

21. A method comprising:

acquiring at least first and second images of a pointer proximate an input surface from different vantages;

processing pixel data of each image that is associated with different regions of said pointer along its length to determine edges of said pointer for each region;

for each region of said pointer, triangulating an area of said pointer based on the determined edges for, the region; and stacking the triangulated areas thereby to generate a volumetric representation of said pointer.

22. The method of claim 21 further comprising determining the centroid of the volumetric representation of said pointer thereby to determine the centroid of said pointer.

23. The method of claim 22 further comprising examining the volumetric representation of said pointer to determine the orientation of said pointer relative to said input surface.

24. The method of claim 21 further comprising using the volumetric representation of said pointer to update a computer generated image displayed on said input surface.

* * * * *